（12） United States Patent
Veilleux, Jr. et al.

(10) Patent No.: US 11,060,593 B2
(45) Date of Patent: Jul. 13, 2021

(54) JAM-TOLERANT ELECTRIC ROTARY ACTUATOR

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 447 days.

(21) Appl. No.: 16/165,420

(22) Filed: Oct. 19, 2018

(65) Prior Publication Data

US 2020/0124150 A1    Apr. 23, 2020

(51) Int. Cl.
| | |
|---|---|
| *F16H 37/06* | (2006.01) |
| *F16H 1/28* | (2006.01) |
| *F16H 57/02* | (2012.01) |
| *H02K 7/116* | (2006.01) |
| *H02K 16/02* | (2006.01) |
| *H02K 21/24* | (2006.01) |

(52) U.S. Cl.
CPC ............. *F16H 37/065* (2013.01); *F16H 1/28* (2013.01); *F16H 57/02* (2013.01); *H02K 7/116* (2013.01); *H02K 16/02* (2013.01); *H02K 21/24* (2013.01); *F16H 2057/02034* (2013.01)

(58) Field of Classification Search
None
See application file for complete search history.

(56) References Cited

U.S. PATENT DOCUMENTS

| 4,525,655 A | * | 6/1985 | Walker ................... H02K 7/116 310/112 |
|---|---|---|---|
| 4,575,027 A | | 3/1986 | Cronin |
| 5,518,466 A | | 5/1996 | Tiedeman |
| | | (Continued) | |

FOREIGN PATENT DOCUMENTS

| EP | 1863154 A2 | 12/2007 |
|---|---|---|
| WO | 2004027266 A2 | 4/2004 |
| | (Continued) | |

OTHER PUBLICATIONS

The Extended European Search Report for Application No. 19204170.5-1201; Report dated Feb. 19, 2020; Report Received Date: Mar. 17, 2020; 10 pages.

*Primary Examiner* — Dirk Wright
(74) *Attorney, Agent, or Firm* — Cantor Colburn LLP

(57) ABSTRACT

A rotary actuator including: an electric motor including: a left shaft projecting out towards a left-hand side; a left motor operably connected to the left shaft; a right shaft projecting out towards a right-hand side; and a right motor operably connected to the right shaft; an actuator housing operably connected to the right shaft; a left outer actuator shaft operably connected to the actuator housing; a left inner actuator shaft operably connected to the left shaft; and an output gearbox including: a ring gear rigidly connected to the left outer actuator shaft; a center gear located within the ring gear, the center gear being operably connected to the left inner actuator shaft; a planetary gear interposed between the ring gear and center gear, the planetary gear meshing with the ring gear and center gear; and an actuator stub operably connected to the planetary gear.

20 Claims, 4 Drawing Sheets

(56) References Cited

U.S. PATENT DOCUMENTS

| | | | |
|---|---|---|---|
| 7,410,132 | B1 | 8/2008 | Flatt |
| 8,267,350 | B2 | 9/2012 | Elliott et al. |
| 8,336,818 | B2 | 12/2012 | Flatt |
| 10,252,609 | B2 * | 4/2019 | Falls ................... B60L 15/2054 |
| 10,439,470 | B2 * | 10/2019 | Hornischer .......... B60K 17/046 |
| 2006/0113933 | A1 | 6/2006 | Blanding et al. |
| 2009/0289145 | A1 | 11/2009 | Behar et al. |
| 2014/0191606 | A1 | 7/2014 | Gieras et al. |

FOREIGN PATENT DOCUMENTS

| | | | |
|---|---|---|---|
| WO | 2008034520 | A1 | 3/2008 |
| WO | 2008100372 | A2 | 8/2008 |
| WO | 2017123987 | A1 | 7/2017 |

* cited by examiner

JAM-TOLERANT ELECTRIC ROTARY ACTUATOR

BACKGROUND

The subject matter disclosed herein generally relates to electric rotary actuators, and more particularly to a method and apparatus for preventing jamming of electric rotary actuators.

Conventional direct-drive rotary permanent magnet (PM) motors produce force densities that are average for actuating various parts/loads onboard aircraft. On the other hand, modern rotary actuators (RA) driven by rotary PM motors produce much higher force density than conventional direct-drive rotary PM motors.

Thus, for the more electric aircraft/engine (MEA/MEE) architectures, RAs with rotary PM brushless motors are desirable, because they can develop much higher thrust with a lower mass and volume envelope. Potential applications for RAs in aircraft technology may include but are not limited to flight control (e.g., both primary and secondary control surfaces), fuel systems management, lubrication systems management, and aircraft equipment and environmental control systems.

Conventional actuators may be used with rotary induction motors for flap control of aircraft wing surfaces. Although, these actuators can provide a convenient method of control, their drawback is low force density, because the weight and volume of induction motors are greater than those of PM brushless motors of the same rating. Also, these devices are subject to undesirable jamming.

BRIEF SUMMARY

According to one embodiment, a rotary actuator is provided. The rotary actuator including: an electric motor including: a left shaft projecting out towards a left-hand side of the rotary actuator; a left motor operably connected to the left shaft, such that the left motor rotates the left shaft; a right shaft projecting out towards a right-hand side of the rotary actuator; and a right motor operably connected to the right shaft, such that the right motor rotates the right shaft; an actuator housing operably connected to the right shaft, such that the actuator housing rotates when the right shaft rotates; a left outer actuator shaft operably connected to the actuator housing, such that the left outer actuator shaft rotates when the actuator housing rotates; a left inner actuator shaft operably connected to the left shaft, such that the left inner actuator shaft rotates when the left shaft rotates; and an output gearbox including: a ring gear rigidly connected to the left outer actuator shaft, such that the ring gear rotates when the left outer actuator shaft rotates; a center gear located within the ring gear, the center gear being operably connected to the left inner actuator shaft, such that the center gear rotates when the left inner actuator shaft rotates; a planetary gear interposed between the ring gear and the center gear, the planetary gear meshing with the ring gear and the center gear, such that the planetary gear rotates when at least one of the ring gear and the center gear rotates; and an actuator stub operably connected to the planetary gear, such that the actuator stub rotates with the planetary gear.

In addition to one or more of the features described above, or as an alternative, further embodiments may include an actuator link operably connecting the center gear to the planetary gear, wherein the actuator stub is operably connected to the planetary gear through the actuator link.

In addition to one or more of the features described above, or as an alternative, further embodiments may include that the actuator link is operably connected to the center gear at a center point of the center gear.

In addition to one or more of the features described above, or as an alternative, further embodiments may include that the actuator link is operably connected to the planetary gear at a center point of the planetary gear.

In addition to one or more of the features described above, or as an alternative, further embodiments may include that the left inner actuator shaft is located within the left outer actuator shaft.

In addition to one or more of the features described above, or as an alternative, further embodiments may include that the left inner actuator shaft is coaxial to the left outer actuator shaft.

In addition to one or more of the features described above, or as an alternative, further embodiments may include: a left reduction gearbox, wherein the left shaft is operably connected to the left inner actuator shaft through the reduction gearbox.

In addition to one or more of the features described above, or as an alternative, further embodiments may include: a right reduction gearbox operably connected to the right shaft, such that the right reduction gearbox rotates when the right shaft rotates; a right output shaft operably connected to the right reduction gearbox, such that the right output shaft rotates when the right reduction gearbox rotates; and a right housing gear operably connecting the right output shaft to the actuator housing, such that the actuator housing rotates when the right output shaft rotates.

In addition to one or more of the features described above, or as an alternative, further embodiments may include that the electric motor is a contra-rotating permanent magnet brushless motor with axial flux.

In addition to one or more of the features described above, or as an alternative, further embodiments may include that the right motor further includes: a right rotor operably connected to the right shaft, such that when the right rotor rotates the right shaft rotates; and a right stator core having windings configured to produce a magnetic field to rotate the right rotor when electricity is provided to the right stator core.

In addition to one or more of the features described above, or as an alternative, further embodiments may include that the left motor further includes: a left rotor operably connected to the left shaft, such that when the left rotor rotates the left shaft rotates; and a left stator core having windings configured to produce a magnetic field to rotate the left rotor when electricity is provided to the left stator core.

In addition to one or more of the features described above, or as an alternative, further embodiments may include that the left outer actuator shaft is operably connected to the actuator housing through a left housing gear.

In addition to one or more of the features described above, or as an alternative, further embodiments may include that the actuator housing encloses the electric motor.

In addition to one or more of the features described above, or as an alternative, further embodiments may include that the actuator housing further includes a circumferential slider that slides within a circumferential slider slot that is anchored to a fixed frame.

In addition to one or more of the features described above, or as an alternative, further embodiments may include that the left stator core, the right stator core, the left rotor, the right rotor, the left shaft, and the right shaft are each coaxial to a longitudinal axis of the electric motor.

In addition to one or more of the features described above, or as an alternative, further embodiments may include that the center gear and the ring gear are each coaxial to a longitudinal axis of the electric motor.

According to another embodiment, a method of operating a rotary actuator is provided. The method including: generating a magnetic field using a left stator of a left motor; rotating a left rotor of the left motor using the magnetic field generated by the left stator; rotating a left shaft operably connected to the left rotor, such that when the left rotor rotates the left shaft rotates; rotating a left inner actuator shaft operably connected to the left shaft, such that the left inner actuator shaft rotates when the left shaft rotates; rotating a center gear operably connected to the left inner actuator shaft, such that the center gear rotates when the left inner actuator shaft rotates; and applying a rotational force on a planetary gear in a first direction, the planetary gear meshing with the center gear such that when the center gear rotates the planetary gear rotates.

In addition to one or more of the features described above, or as an alternative, further embodiments may include: generating a magnetic field using a right stator of a right motor; rotating a right rotor of the right motor using the magnetic field generated by the right stator; rotating a right shaft operably connected to the right rotor, such that when the right rotor rotates the right shaft rotates; rotating an actuator housing operably connected to the right shaft, such that the actuator housing rotates when the right shaft rotates; rotating a left outer actuator shaft operably connected to the actuator housing, such that the left outer actuator shaft rotates when the actuator housing rotates; rotating a ring gear operably connected to the left outer actuator shaft, such that the ring gear rotates when the left outer actuator shaft rotates; and applying a rotational force on a planetary gear in a second direction, the planetary gear meshing with the ring gear such that when the ring gear rotates the planetary gear rotates.

In addition to one or more of the features described above, or as an alternative, further embodiments may include: detecting a decreased rotation of the center gear indicative of a jam; generating a magnetic field using a right stator of a right motor; rotating a right rotor of the right motor using the magnetic field generated by the right stator; rotating a right shaft operably connected to the right rotor, such that when the right rotor rotates the right shaft rotates; rotating an actuator housing operably connected to the right shaft, such that the actuator housing rotates when the right shaft rotates; rotating a left outer actuator shaft operably connected to the actuator housing, such that the left outer actuator shaft rotates when the actuator housing rotates; rotating a ring gear operably connected to the left outer actuator shaft, such that the ring gear rotates when the left outer actuator shaft rotates; and applying a rotational force on a planetary gear in a second direction, the planetary gear meshing with the ring gear such that when the ring gear rotates the planetary gear rotates.

According to another embodiment, a rotational actuation system is provided. The rotational actuation system including: a load; a rotary actuator configured to apply a force to the load, the rotary actuator including: an electric motor including: a left shaft projecting out towards a left-hand side of the rotary actuator; a left motor operably connected to the left shaft, such that the left motor rotates the left shaft; a right shaft projecting out towards a right-hand side of the rotary actuator; and a right motor operably connected to the right shaft, such that the right motor rotates the right shaft; an actuator housing operably connected to the right shaft, such that the actuator housing rotates when the right shaft rotates; a left outer actuator shaft operably connected to the actuator housing, such that the left outer actuator shaft rotates when the actuator housing rotates; a left inner actuator shaft operably connected to the left shaft, such that the left inner actuator shaft rotates when the left shaft rotates; and an output gearbox including: a ring gear rigidly connected to the left outer actuator shaft, such that the ring gear rotates when the left outer actuator shaft rotates; a center gear located within the ring gear, the center gear being operably connected to the left inner actuator shaft, such that the center gear rotates when the left inner actuator shaft rotates; a planetary gear interposed between the ring gear and the center gear, the planetary gear meshing with the ring gear and the center gear, such that the planetary gear rotates when at least one of the ring gear and the center gear rotates; and an actuator stub operably connected to the planetary gear, such that the actuator stub rotates with the planetary gear, wherein the actuator stub is operably connected to the load.

Technical effects of embodiments of the present disclosure include rotating an output gear box using at least one of a first motor operably connected to the output gearbox and a second motor operably connected to the output gearbox.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
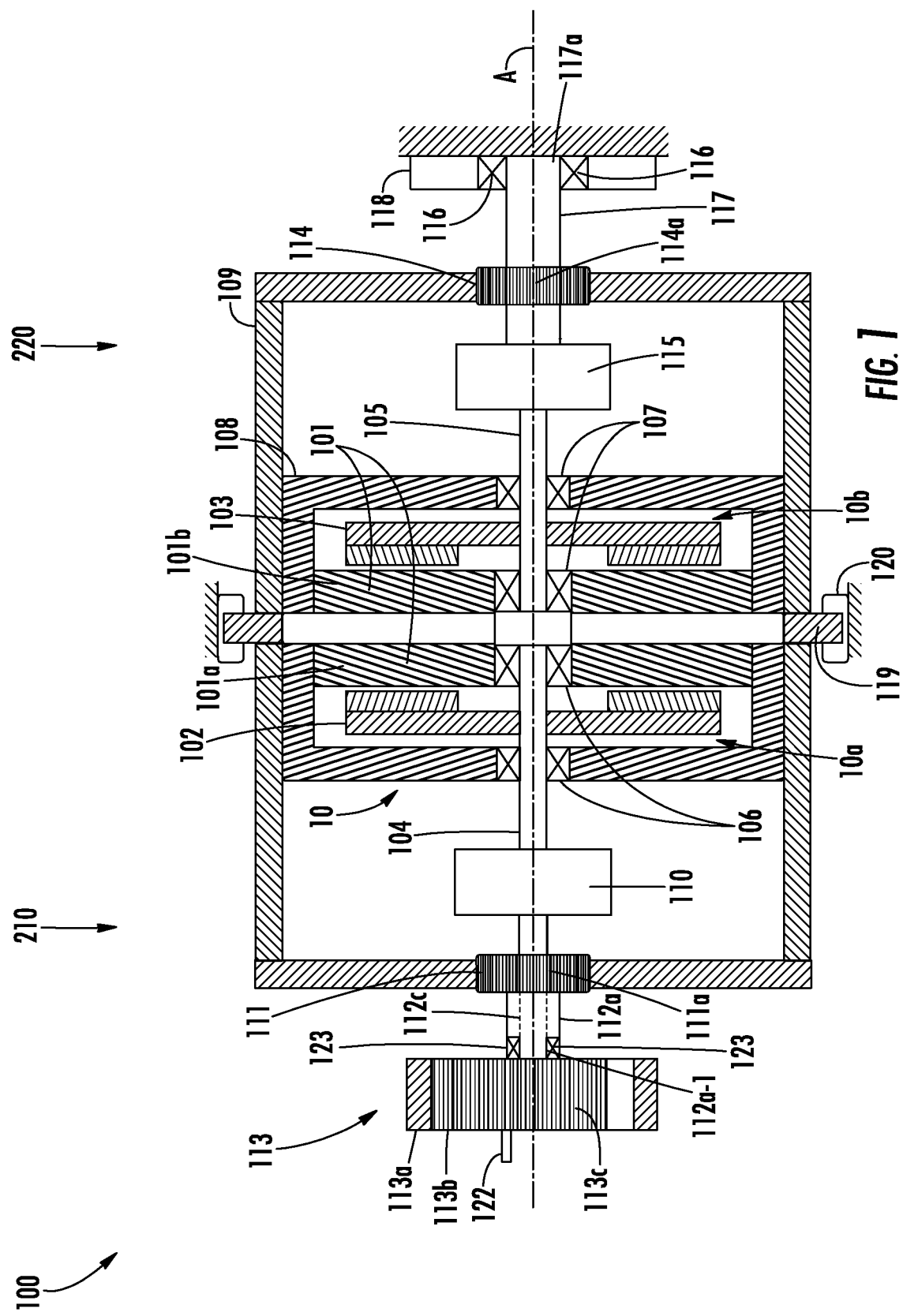
FIG. 1 is a cross-sectional view of a rotary actuator, according to an embodiment of the present disclosure.

FIG. 1 is a cross-sectional illustration of an RA 100 having an electric motor 10. In an embodiment, the electric motor 10 is a contra-rotating PM brushless motor with axial flux, as shown in FIG. 1. It is understood that while a PM brushless motor is utilized, other electrical motors may be utilized with embodiments disclosed herein, such as, for example, a cage induction motor, a switched reluctance motor, a variable reluctance motor, or any other suitable electric motor known to one of skill in the art.

The electric motor 10 comprises a left motor 10*a* and a right motor 10*b* located at least partially within a motor housing 108. As used herein the prefixes "left" and "right"

indicate a side of the electric motor 10 where that component is located. For example, the left motor 10a may be located on the left-hand side 210 of the electric motor 10 and the right motor 10b may be located on the right-hand side 220 of the electric motor 10. The left shaft 104 and the right shaft 105 may partially project out of the motor housing 108, as shown within FIG. 1. The stator core 101 of the electric motor 10 may be subdivided into a left stator core 101a for the left motor 10a and a right stator core 101b for the right motor 10b. The left motor 10a includes the left stator core 101a, a left rotor 102, and the left shaft 104. The right motor 10b includes the right stator core 101b, a right rotor 103, and the right shaft 105. The stator core 101, the left rotor 102, the right rotor 103, the left shaft 104, and the right shaft 105 are each coaxial to a longitudinal axis A of the electric motor 10. The electric motor 10 may be enclosed within the motor housing 108 as shown in FIG. 1.

The left core 101a has an independent winding for the left rotor 102 and the right core 101b has an independent winding for the right rotor 103. In an embodiment, the windings of the left core 101a and the right core 101b may be polyphase windings. In another embodiment, the windings of the left core 101a and the right core 101b may be three-phase windings and fed with power electronics converters. The windings of the left core 101a and the right core 101b produce rotating magnetic fields in opposite directions and/or in the same direction. The direction of the magnetic fields produced may depend on the method of control of windings and applications.

The left shaft 104 is operably connected to the left rotor 102, such that when the left rotor 102 is rotated by the left core 101a then the left shaft 104 rotates with the left rotor 102. The right shaft 105 is operably connected to the right rotor 103, such that when the right rotor 103 is rotated by the right core 101b then the right shaft 105 rotates with the right rotor 103. The left shaft 104 and the right shaft 105 are independent of each other and can spin with the same speed or different speeds, either in the same or in opposite directions. As shown in FIG. 1, the left shaft 104 is supported by support bearings 106 and the right shaft 105 is supported by support bearings 107.

In addition to the electric motor 10, the RA 100 is equipped with two reduction gear boxes 110, 115. The left reduction gear box 110 is operably connected to the left shaft 104 and the right reduction gear box 115 is operably connected to the right shaft 105. In an embodiment, the two reduction gear boxes 110, 115 may be planetary gear boxes. The reduction gear boxes 110, 115 are configured to reduce the speed of the output shafts 104, 105 of the electric motor 10, because the speed of the electric motor 10 may be relatively high. Advantageously, a high-speed electric motor 10 may have better performance, efficiency, lower weight, and reduced size than low-speed or medium-speed electric motors. Therefore, the electric motor 10 may be operated at an optimum highest rotational speed.

The RA 100 can be operable in multiple different modes. The first mode may be as a "Jam-Tolerant" rotary actuator configuration and may include the output gear box 113. The output gear box 113 comprises a three-gear mechanism, discussed further below. The output gear box 113 is configured to move a load (e.g., flaps, slats, spoilers, etc.) within a rotational actuation system, while receiving rotational input through either the left outer actuator shaft 112a or the left inner actuator shaft 112c. The output gearbox 113 includes a center gear 113c, a ring gear 113a, and a planetary gear 113b. The ring gear 113a is rigidly connected to the left outer actuator shaft 112a, such that the ring gear 113a rotates when the left outer actuator shaft 112a rotates.

Figure 2:
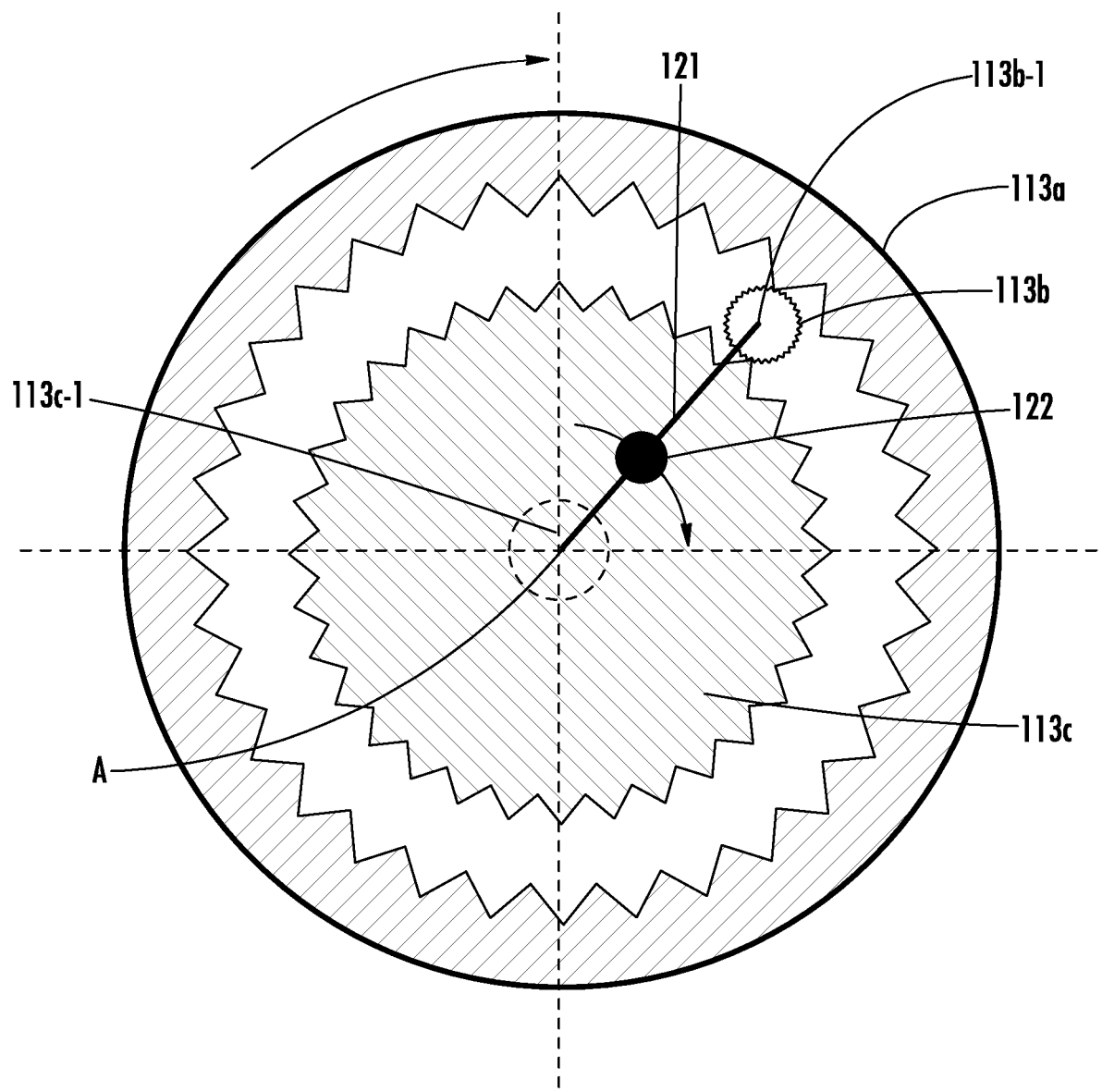
FIG. 2 is a cross-sectional view of the output gear box of the rotary actuator, according to an embodiment of the present disclosure

The center gear 113c is located within the ring gear 113a. The center gear 113c is operably connected to the left inner actuator shaft 112c, such that the center gear 113c rotates when the left inner actuator shaft 112c rotates. The planetary gear 113b is interposed between the ring gear 113a and the center gear 113c. The planetary gear 113b meshes with the ring gear 113a and the center gear 113c, such that the planetary gear 113b rotates when at least one of the ring gear 113a and the center gear 113c rotates. The ring gear 113a and the center gear 113c are each coaxial to the longitudinal axis A of the electric motor 10, as shown in FIGS. 1 and 2.

The left inner actuator shaft 112c is coaxial with left outer actuator shaft 112a and supported by inner bearings 123 to allow free/unimpeded rotation of the left inner actuator shaft 112c within left outer actuator shaft 112a. Other inner support bearings between the two coaxial shafts 112a, 112c may be used as needed, but are not shown (for clarity).

The left inner actuator shaft 112c is connected to the left reduction gearbox 110, which receives input from left output shaft 104 of the left rotor 102. The left output shaft 104 is supported by support bearings 106, as discussed above. When energized by the induced magnetic field in the windings of the left stator core 101a, the left rotor 102 rotates the left output shaft 104 and the left output shaft 104 (i.e., through the left reduction gearbox 110) turns left inner actuator shaft 112c.

The left inner actuator shaft 112c is operably connected to the center gear 113c of the output gear box 113. The inner actuator shaft 112c is rigidly connected to the center gear 113c. The center gear 113c is meshed with a planetary gear 113b, as shown in FIG. 2.

As shown in FIG. 2, an actuator link 121 operably connects a center 113c-1 of the center gear 113c and a center 113b-1 of the planetary gear 113b. The actuator link 121 may pass through the center point 113c-1 of the center gear 113c and the center point 113b-1 of the planetary gear 113b. An actuator link stub 122 may be attached to the actuator link 121. The actuator link stub 122 extends outward from the actuator link 121 and provides an output for the RA 100 to link to a load.

The planetary gear 113b is also meshed with ring gear 113a. The ring gear 113a is operably connected to the left outer actuator shaft 112a, such that the ring gear 113a rotates when the left outer actuator shaft 112a rotates. Thus, the planetary gear 113b may be rotated by either the center gear 113c and/or the ring gear 113c, which ensures smooth and continuous transfer of shaft output power and its efficient conversion into rotary motion and torque at the output gear box 113.

The right reduction gearbox 115 receives input from right output shaft 105 of the right rotor 103. The right output shaft 105 is supported by support bearings 107, as discussed above. When energized by the induced magnetic field in the windings of the right stator core 101b, the right rotor 103 rotates the right output shaft 105 and the right output shaft 105 (i.e., through the right reduction gearbox 115) turns the right output shaft 117. The right output shaft 117 rotates the right housing gear 114, which rotates the actuator housing 109. The right housing gear 114 meshes with a gear 114a, which is on the right output shaft 117.

The left outer actuator shaft 112a is operably connected to the left housing gear 111, which rotates when the actuator housing 109 rotates. The left housing gear 111 meshes with a gear 111a, which is on the right side of the left outer actuator shaft 112a. The actuator housing 109 encloses the electric motor 10, as seen in FIG. 1.

The left outer actuator shaft 112a is operably connected to the ring gear 113a of the output gear box 113. The left end 112a-1 of the left outer actuator shaft 112a may be rigidly connect to the ring gear 113a. The ring gear 113a is meshed with the planetary gear 113b, as shown in FIG. 2.

The right end 117a of the right actuator shaft 117 is supported by bearings 116 and is free to rotate inside the support plate 118. The support plate 118 is anchored to a fixed frame.

Advantageously, the left outer actuator shaft 112a is geared with the actuator housing 109 through the gear 111a and the left housing gear 111 and the right output shaft 117 is geared with the actuator housing 109 through the gear 114a and the right housing gear 114. This arrangement allows the rotation of the actuator housing 109 around the longitudinal axis A by rotation of at least one of the left outer actuator shaft 112a and the right output shaft 117.

The motor housing 108 is secured to the inside of the actuator housing 109. The motor housing 108 and the actuator housing 109 can be made from a lightweight/durable composite material for additional weight savings. The actuator housing 109 may include a circumferential slider 119 that slides within a circumferential slider slot 120 that is anchored to a fixed frame. The circumferential slider 119 and the slider slot 120 provide mid-frame and lateral stability and support for the RA 100. Alternatively, bearings (not shown) may be utilized in place of the circumferential slider 119 and the circumferential slider slot 120. Alternatively, the circumferential slider 119 and the circumferential slider slot 120 may not be used. The circumferential slider 119 and the circumferential slider slot 120 are not necessary for operation of the RA 100 but may provide structural support to a center of the RA 100.

When the RA 100 is operating in a normal operation mode, the left inner actuator shaft 112c is rigidly connected with the center gear 113c. As a result, the center gear 113c rotates as the left rotor 102 rotates. As discussed above, the center gear 113c is also meshed with the planetary gear 113b. The actuator link 121 connects the center 113c-1 of the center gear 113c to the center 113b-1 of the planetary gear 113b and rotates around the center of the center gear 113c when the planetary gear 113b rotates. Thus, the actuator link stub 122 attached to the actuator link 121 also rotates whenever any of the three gears (113a, 113b, 113c) rotate. Thus, the actuator link stub 122 provides the actual rotary actuation output of the RA 100, which acts on the load (e.g., flaps, slats, spoilers, etc.). As also discussed above, the planetary gear 113b is also meshed with ring gear 113a, which is rigidly connected to left outer actuator shaft 112a. As the planetary gear 113b is being rotated by the center gear 113c, the ring gear 113a may remain relatively stationary to the planetary gear 113b in normal operation. Alternatively, the ring gear 113a may be rotated by the right rotor 103 to provide breaking to the planetary gear 113b (i.e., rotated in the opposite direction as the planetary gear 113b) or provide additional torque to the planetary gear 113b (i.e., rotated in the same direction as the planetary gear 113b).

In the event a "jam" occurs in the left gearbox 110, the left shaft 104, or the support bearings 106 for the left shaft 104, then the rotation of the left inner actuator shaft 112c will stop, and thus the RA 100 shifts from normal operation mode to "jam" mode. In this inadvertent "jam" mode, no rotation input is delivered to center gear 113c inside the output gear box 113. As a result, actuator link 121 does not rotate. Therefore, no actuation input is received from actuator link stub 122 to the load (e.g., flaps, slats, spoilers, etc.). The "jam" mode may be detected by using a sensor (not shown) to detect/monitor rotation of left inner actuator shaft 112c. This sensor could detect "jam" mode regardless of what has caused it (i.e. jammed left inner actuator shaft 112c, or jammed left reduction gearbox 110, or jammed bearings 106, etc.).

Following detection of a "jam" mode as described above, the RA 100 may shift into a "jam-tolerant" mode. The "jam-tolerant" mode may include rotating the right actuator shaft 117 using the right motor 10b to deliver its output torque through the meshed gears 114 and 114a to rotate the actuator housing 109. As described above, the actuator housing 109 with its attached circumferential slider 119 is free to rotate along the circumferential slider slot 120 to provide "jam-tolerant" operation. The circumferential slider slot 120 is anchored to a fixed frame.

The rotating actuator housing 109, through the left housing gear 111 and the gear 111a, engages the left outer actuator shaft 112a. The rotating left outer actuator shaft 112a can roll around a seized left inner actuator shaft 112c (e.g., that is seized due to the jam) as it is supported by internal bearings 123. The left outer actuator shaft 112a is rigidly connected to ring gear 113a, which rotates with the left outer actuator shaft 112a. The ring gear 113a is meshed with the planetary gear 113b, thus the planetary gear 113b is rotated along with the ring gear 113a when the ring gear 113a is rotated by the left outer actuator shaft 112a. The planetary gear 113b is free to rotate around a stopped center gear 113c (e.g., that is stopped due to the jam). The actuator link 121 connecting the center 113b-1 of the planetary gear 113b and the center 113c-1 of the center gear 113c is free to pivot around the center of the stopped center gear 113c. This allows unimpeded rotation of actuator link 121 around longitudinal axis A (i.e., the center of stopped center gear 113c). The actuator link stub 122 is fixed to the rotating actuator link 121 and provides the actual rotary actuation output, thus helping to ensure smooth and continuous transfer of shaft output power and its efficient conversion into rotary motion and torque at the output gear box 113.

The RA 100 may include other operation modes in addition to the normal mode, the "jam" mode, and the "jam-tolerant" mode described above. The actuator link stub 122 can rotate in a multitude of operational modes described below. In a first example mode, the center gear 113c may be stopped while the ring gear 113a and the planetary gear 113b rotate. In a second example mode, the ring gear 113a may be stopped while the center gear 113c and the planetary gear 113b rotate. In a third example mode, the ring gear 113a, the planetary gear 113b, and the center gear 113c gear may all be rotated either in the same and/or opposite directions and either with the same and/or different rotational speeds. For example, the ring gear 113a and the center gear 113c may be rotating in opposite directions to increase rotation of the planetary gear 113 and subsequently torque on the actuator link stub 122. In another example, the ring gear 113a and the center gear 113c may be rotating in the same direction to reduce rotation of the planetary gear 113b and subsequently act as a brake on the actuator link stub 122.

Advantageously, the speed and direction of the rotation of the actuator link stub 122 can be varied as needed by modulating the magnetic field induction strength in either the windings of the left stator core 101a and/or the right stator core 101b, thus further extending the operational range of the RA 100 in addition to the "jam-tolerant" operation.

Figure 3:
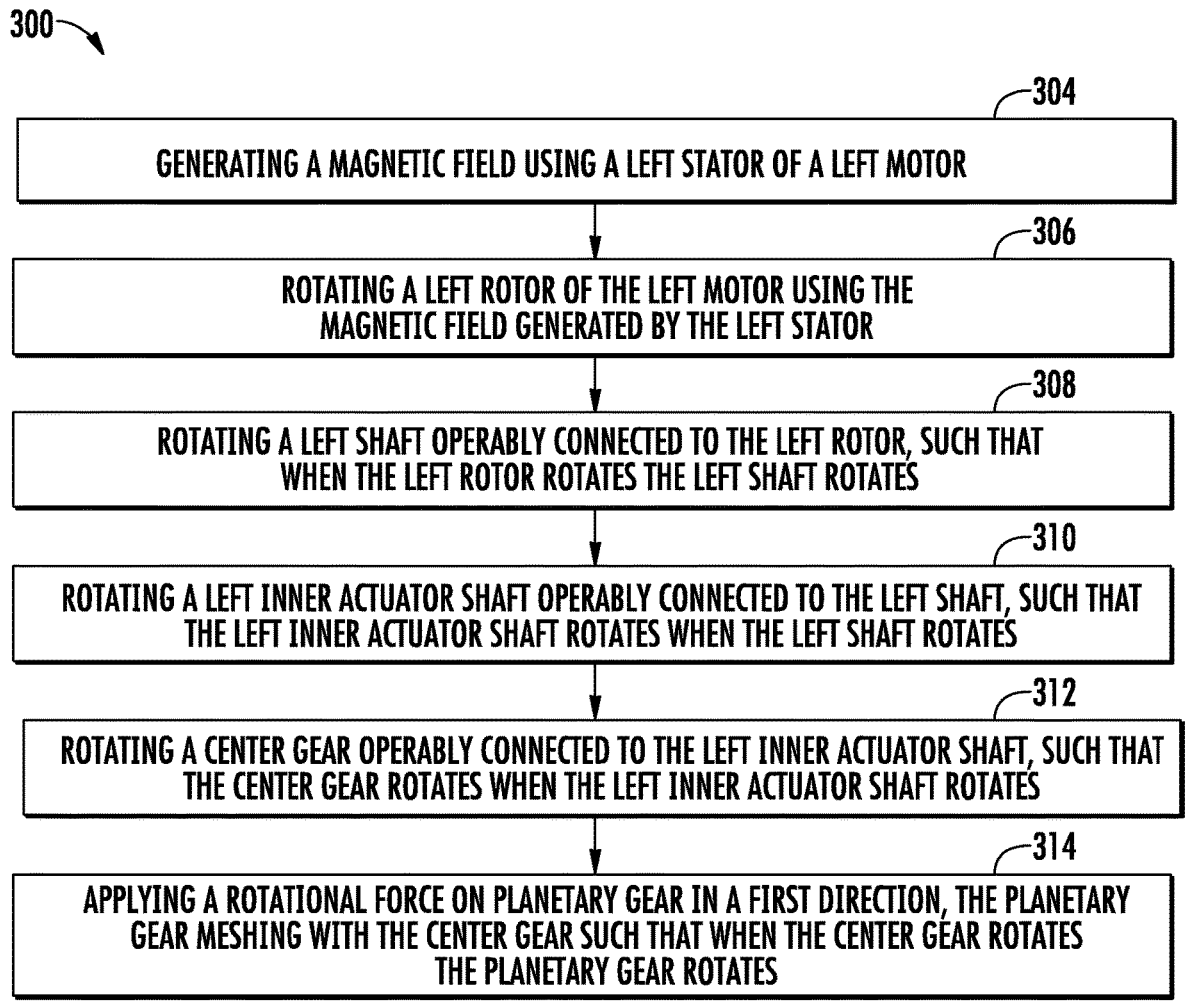
FIG. 3 is a flow diagram of a method of operating a rotary actuator, according to an embodiment of the present disclosure.
Figure 4:
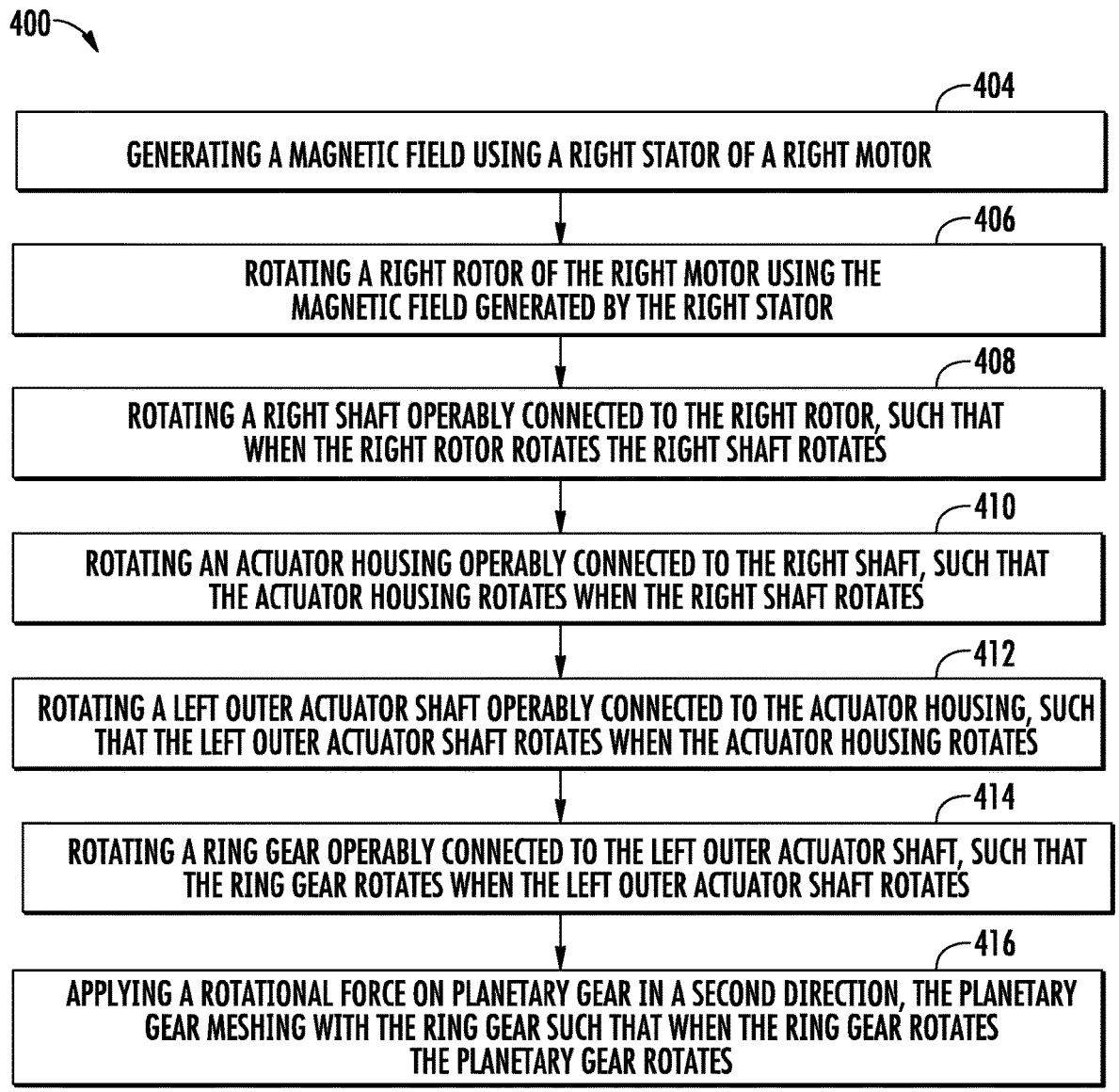
FIG. 4 is a flow diagram of a method of operating a rotary actuator, according to an embodiment of the present disclosure.

Referring now to FIGS. 3 and 4, while referencing components of FIGS. 1-2, a flow chart of method 300 of operating the RA 100 is illustrated, in accordance with an embodiment of the present disclosure. At block 304, a magnetic field is generated using a left stator 101a of a left motor 10a. At block 306, a left rotor 102 of the left motor 10a is rotated using the magnetic field generated by the left stator 101a. At block 308, a left shaft 104 is rotated. The left shaft 104 is operably connected to the left rotor 102, such that when the left rotor 102 rotates the left shaft 104 rotates. At block 310, a left inner actuator shaft 112c is rotated. The left inner actuator shaft 112c is operably connected to the left shaft 104, through the left reduction gearbox 110, such that the left inner actuator shaft 112c rotates when the left shaft 104 rotates. At block 312, a center gear 113c is rotated. The center gear 113c is operably connected to the left inner actuator shaft 112c, such that the center gear rotates 113c when the left inner actuator shaft 112c rotates. At block 314, a rotational force is applied on a planetary gear 113b in a first direction. The planetary gear 113b meshes with the center gear 113c, such that when the center gear 113c rotates the planetary gear 113b rotates. The first direction may be clockwise or counter clockwise around the longitudinal axis A.

The method 300 may further comprise method 400 of FIG. 4. Method 400 may be carried out if a jam is detected (a decreased rotation of the center gear 113c indicative of a jam), braking of the left motor 10a is required, or additional torque is required. This detection may prompt the magnetic field generation of the right stator 101b. At block 404, a magnetic field is generated using a right stator 101b of a right motor 10b. The method may further comprise: detecting a decreased rotation of the center gear 113c indicative of a jam. This detection may prompt the magnetic field generation of the right stator 101b. At block 406, a right rotor 103 of the right motor 10b is rotated using the magnetic field generated by the right stator 101b. At block 408, a right shaft 105 is rotated. The right shaft 105 is operably connected to the right rotor 103, such that when the right rotor 103 rotates the right shaft rotates 105. The right output shaft 117 is operably connected to the right shaft 105 through the right reduction gearbox 115, such that the right output shaft 117 rotates when right shaft 105 rotates. The actuator housing is connected to the right output shaft 117, such that the actuator housing 109 rotates when the right output shaft 117 rotates. Therefore, at block 410, an actuator housing 109 is rotated. At block 412, a left outer actuator shaft 112a is rotated. The left outer actuator shaft 112a is operably connected to the actuator housing 109, such that the left outer actuator shaft 112a rotates when the actuator housing 109 rotates. At block 414, a ring gear 113a rotated. The ring gear 113a is operably connected to the left outer actuator shaft 112a, such that the ring gear 113a rotates when the left outer actuator shaft 112a rotates. At block 416, a rotational force is applied on a planetary gear 113b in a second direction. The second direction being opposite to the first direction or the same as the first direction. The planetary gear 113b meshes with the ring gear 113a, such that when the ring gear 113a rotates the planetary gear 113b rotates.

While the above description has described the flow process of FIGS. 3 and 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary actuator, comprising:
an electric motor comprising:
a left shaft projecting out towards a left-hand side of the rotary actuator;
a left motor operably connected to the left shaft, such that the left motor rotates the left shaft;
a right shaft projecting out towards a right-hand side of the rotary actuator; and
a right motor operably connected to the right shaft, such that the right motor rotates the right shaft;
an actuator housing operably connected to the right shaft, such that the actuator housing rotates when the right shaft rotates;
a left outer actuator shaft operably connected to the actuator housing, such that the left outer actuator shaft rotates when the actuator housing rotates;
a left inner actuator shaft operably connected to the left shaft, such that the left inner actuator shaft rotates when the left shaft rotates; and
an output gearbox comprising:
a ring gear rigidly connected to the left outer actuator shaft, such that the ring gear rotates when the left outer actuator shaft rotates;
a center gear located within the ring gear, the center gear being operably connected to the left inner actuator shaft, such that the center gear rotates when the left inner actuator shaft rotates;
a planetary gear interposed between the ring gear and the center gear, the planetary gear meshing with the ring gear and the center gear, such that the planetary gear rotates when at least one of the ring gear and the center gear rotates; and
an actuator stub operably connected to the planetary gear, such that the actuator stub rotates with the planetary gear.

2. The rotary actuator of claim 1, further comprising:
an actuator link operably connecting the center gear to the planetary gear, wherein the actuator stub is operably connected to the planetary gear through the actuator link.

3. The rotary actuator of claim 2, wherein the actuator link is operably connected to the center gear at a center point of the center gear.

4. The rotary actuator of claim 2, wherein the actuator link is operably connected to the planetary gear at a center point of the planetary gear.

5. The rotary actuator of claim 1, wherein the left inner actuator shaft is located within the left outer actuator shaft.

6. The rotary actuator of claim 1, wherein the left inner actuator shaft is coaxial and the left outer actuator shaft.

7. The rotary actuator of claim 1, further comprising:
a left reduction gearbox, wherein the left shaft is operably connected to the left inner actuator shaft through the reduction gearbox.

8. The rotary actuator of claim 1, further comprising:
a right reduction gearbox operably connected to the right shaft, such that the right reduction gearbox rotates when the right shaft rotates;
a right output shaft operably connected to the right reduction gearbox, such that the right output shaft rotates when the right reduction gearbox rotates; and
a right housing gear operably connecting the right output shaft to the actuator housing, such that the actuator housing rotates when the right output shaft rotates.

9. The rotary actuator of claim 1, wherein the electric motor is a contra-rotating permanent magnet brushless motor with axial flux.

10. The rotary actuator of claim 1, wherein the right motor further comprises:
a right rotor operably connected to the right shaft, such that when the right rotor rotates the right shaft rotates; and
a right stator core having windings configured to produce a magnetic field to rotate the right rotor when electricity is provided to the right stator core.

11. The rotary actuator of claim 1, wherein the left motor further comprises:
a left rotor operably connected to the left shaft, such that when the left rotor rotates the left shaft rotates; and
a left stator core having windings configured to produce a magnetic field to rotate the left rotor when electricity is provided to the left stator core.

12. The rotary actuator of claim 1, wherein the left outer actuator shaft is operably connected to the actuator housing through a left housing gear.

13. The rotary actuator of claim 1, wherein the actuator housing encloses the electric motor.

14. The rotary actuator of claim 1, wherein the actuator housing further comprises a circumferential slider that slides within a circumferential slider slot that is anchored to a fixed frame.

15. The rotary actuator of claim 1, wherein the left stator core, the right stator core, the left rotor, the right rotor, the left shaft, and the right shaft are each coaxial to a longitudinal axis of the electric motor.

16. The rotary actuator of claim 1, wherein the center gear and the ring gear are each coaxial to a longitudinal axis of the electric motor.

17. A method of operating a rotary actuator according to claim 1, the method comprising:
generating a magnetic field using a left stator of a left motor;
rotating a left rotor of the left motor using the magnetic field generated by the left stator;
rotating a left shaft operably connected to the left rotor, such that when the left rotor rotates the left shaft rotates;
rotating a left inner actuator shaft operably connected to the left shaft, such that the left inner actuator shaft rotates when the left shaft rotates;
rotating a center gear operably connected to the left inner actuator shaft, such that the center gear rotates when the left inner actuator shaft rotates; and
applying a rotational force on a planetary gear in a first direction, the planetary gear meshing with the center gear such that when the center gear rotates the planetary gear rotates.

18. The method of claim 17, further comprising:
generating a magnetic field using a right stator of a right motor;
rotating a right rotor of the right motor using the magnetic field generated by the right stator;
rotating a right shaft operably connected to the right rotor, such that when the right rotor rotates the right shaft rotates;
rotating an actuator housing operably connected to the right shaft, such that the actuator housing rotates when the right shaft rotates;
rotating a left outer actuator shaft operably connected to the actuator housing, such that the left outer actuator shaft rotates when the actuator housing rotates;
rotating a ring gear operably connected to the left outer actuator shaft, such that the ring gear rotates when the left outer actuator shaft rotates; and
applying a rotational force on a planetary gear in a second direction, the planetary gear meshing with the ring gear such that when the ring gear rotates the planetary gear rotates.

19. The method of claim 17, further comprising:
detecting a decreased rotation of the center gear indicative of a jam;
generating a magnetic field using a right stator of a right motor;
rotating a right rotor of the right motor using the magnetic field generated by the right stator;
rotating a right shaft operably connected to the right rotor, such that when the right rotor rotates the right shaft rotates;
rotating an actuator housing operably connected to the right shaft, such that the actuator housing rotates when the right shaft rotates;
rotating a left outer actuator shaft operably connected to the actuator housing, such that the left outer actuator shaft rotates when the actuator housing rotates;
rotating a ring gear operably connected to the left outer actuator shaft, such that the ring gear rotates when the left outer actuator shaft rotates; and
applying a rotational force on a planetary gear in a second direction, the planetary gear meshing with the ring gear such that when the ring gear rotates the planetary gear rotates.

20. A rotational actuation system, comprising:
a load;
a rotary actuator configured to apply a force to the load, the rotary actuator comprising:
an electric motor comprising:
a left shaft projecting out towards a left-hand side of the rotary actuator;

a left motor operably connected to the left shaft, such that the left motor rotates the left shaft;

a right shaft projecting out towards a right-hand side of the rotary actuator; and a right motor operably connected to the right shaft, such that the right motor rotates the right shaft;

an actuator housing operably connected to the right shaft, such that the actuator housing rotates when the right shaft rotates;

a left outer actuator shaft operably connected to the actuator housing, such that the left outer actuator shaft rotates when the actuator housing rotates;

a left inner actuator shaft operably connected to the left shaft, such that the left inner actuator shaft rotates when the left shaft rotates; and an output gearbox comprising:

a ring gear rigidly connected to the left outer actuator shaft, such that the ring gear rotates when the left outer actuator shaft rotates;

a center gear located within the ring gear, the center gear being operably connected to the left inner actuator shaft, such that the center gear rotates when the left inner actuator shaft rotates;

a planetary gear interposed between the ring gear and the center gear, the planetary gear meshing with the ring gear and the center gear, such that the planetary gear rotates when at least one of the ring gear and the center gear rotates; and an actuator stub operably connected to the planetary gear, such that the actuator stub rotates with the planetary gear, wherein the actuator stub is operably connected to the load.

* * * * *